United States Patent [19]

Sato

[11] Patent Number: 4,811,622

[45] Date of Patent: Mar. 14, 1989

[54] FORCE MULTIPLIER

[76] Inventor: Shichiro Sato, 15-11, Shimooichi Higashimachi, Nishinomiya-shi, Hyogo-ken, Japan

[21] Appl. No.: 831,438

[22] Filed: Feb. 20, 1986

[30] Foreign Application Priority Data

Feb. 20, 1985 [JP] Japan .................................. 60-33156

[51] Int. Cl.$^4$ ............................................. G05G 1/04
[52] U.S. Cl. ........................................ 74/525; 74/519
[58] Field of Search ................ 74/525, 523, 522, 519, 74/520, 521, 522.5; 312/257 SK

[56] References Cited

U.S. PATENT DOCUMENTS

| | | | |
|---|---|---|---|
| 2,587,746 | 3/1952 | May ........................................ | 74/520 |
| 2,712,851 | 7/1955 | Carter et al. ........................... | 74/520 |
| 3,829,190 | 8/1974 | Jackson ........................ | 312/257 SK |
| 4,190,485 | 2/1980 | Takeda et al. ........................ | 74/525 |

Primary Examiner—Kenneth J. Dorner
Assistant Examiner—Gerald A. Anderson
Attorney, Agent, or Firm—Birch, Stewart, Kolasch & Birch

[57] ABSTRACT

A force multiplier mechanism comprising a base supporting member, a driving lever being pivotably connected by a first pivot means to said base supporting member which can be rotated about the first pivot for a predetermined angle between a first and second position thereof, a driven lever one end of which is pivotably connected to the free end of the driving lever by a second pivot, a follower pivotably connected to the other end of the driven lever which receives a multiplied force and transmits it to other member, said follower being supported remote from the second pivot means by a distance substantially equal to the distance defined between the first and second pivot means, and a guide means for guiding the follower coupled to the driven lever which forces the driven lever to rotate about the second pivot and in turn forces said follower along a continuous pathway to a point located close to said first pivot resulting in high force multiplication.

17 Claims, 19 Drawing Sheets

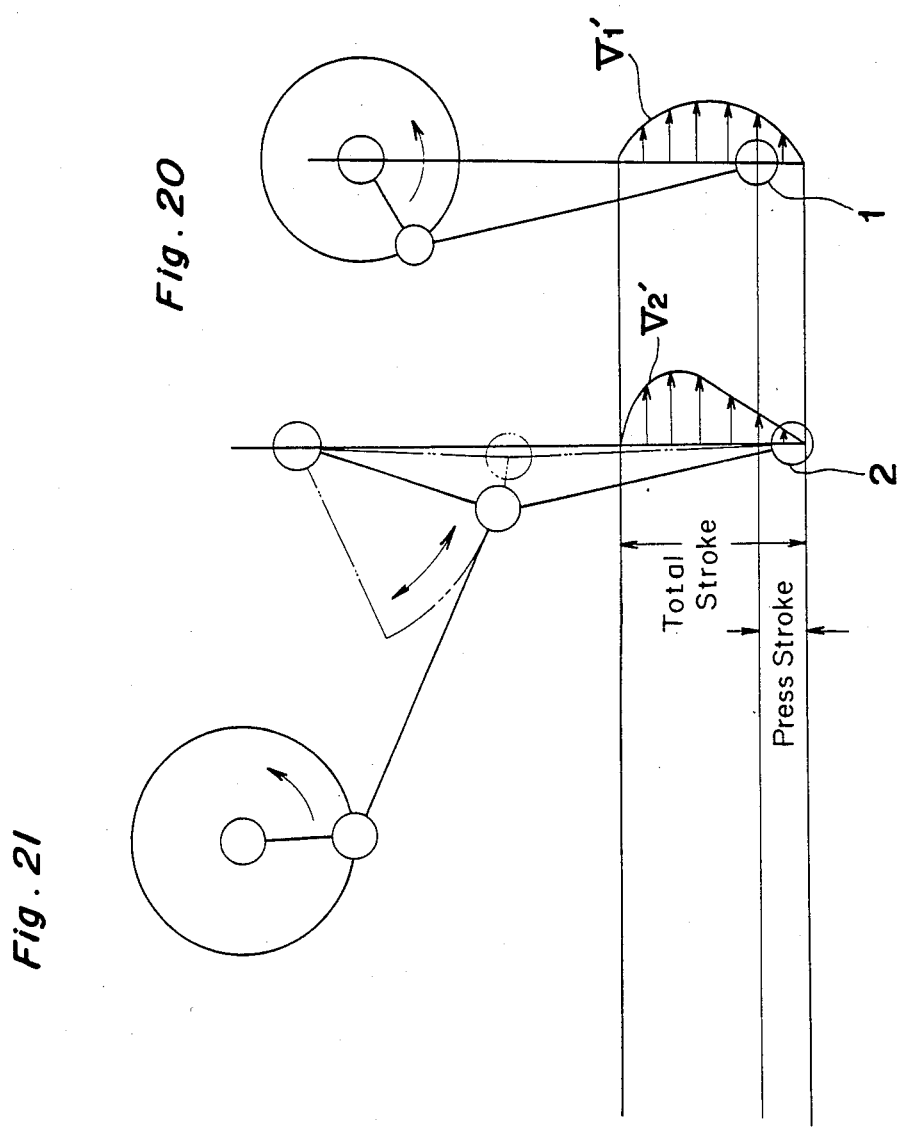

FORCE MULTIPLIER

BACKGROUND OF THE INVENTION

1. Field of the Invention

The present invention relates to a force multiplier for multiplying the force applied onto a driving lever and for transmitting the force multiplied to a driven lever to generate a high press force on a follower of the driven lever.

2. Description of the Prior Art

Conventionally, there has been widely used a crank-pin mechanism as shown schematically in FIG. 20 or a toggle-joint mechanism as shown schematically in FIG. 21 for a driving mechanism of an auto-drive press machine which acts as a force multiplier.

As is well known to those skilled in the art, the output press force P of a slider 1 or 2 for pressing a workpiece (not shown) is inversely proportional to the velocity V thereof: $P \cdot V = K$ (wherein K is a constant proportional to an energy applied exteriorly). In this context, it is desirable to decrease the velocity of the slider upon pressing the work as low as possible in order to obtain a larger press force.

However, the velocity of the slider 1 of the press with a crank-pin mechanism, when the crank-pin is driven at a constant velocity, is varied so as to depict a sine curve as shown by a velocity distribution $V'_1$ in FIG. 20 and, therefore, the velocity remains relatively high even during the press stroke of the slider. For this reason, the magnification of force obtained in the press mentioned above is relatively small. In other words, it is impossible to obtain a high press force without increasing the energy to be applied exteriorly and/or without enlarging the size of the press. Moreover, large noises and strong oscillations are generated upon pressing the work since the press tool cooperating with the slider strikes the work at a relatively high velocity. These lower the working accuracy to the work and shorten the life of the tool.

In the press with the toggle-joint mechanism, as shown in FIG. 21, the velocity distribution $V'_2$ of the slider 2 is so improved as to give a velocity relatively lower than that of the velocity distribution $V'_1$ during the press stroke. But the ratio of reduction in the velocity remains several tens % at most.

The inventor of the present invention has proposed one new mechanism for the force multiplier in the Japanese Patent Application No. 226200/1983 which corresponds to the Japanese Patent Laid Open Publication No. 121356/1985.

FIG. 22 shows an example according to said new mechanism proposed.

As shown in FIG. 22, the mechanism is comprised of a circular disk 3 being supported in a hole 4 of a supporting frame 5 rotatably about the center thereof, a driving lever 6 being formed extended from the peripheral portion of said circular disk in the radial direction thereof, and a driven lever 7 having a pin 8 as a follower at one end portion thereof which is supported pivotably by an axis 9 on the supporting frame at the other end thereof, said pin 8 being fitted into a groove 10 as a guide means which is formed on the circular disk in the radial direction thereof. As is shown in FIG. 22, the distance defined between the center $0_2$ of the pin 8 is so determined as to be longer by a predetermined small distance e than the distance r defined between the center $0_1$ of the axis 9 and the center 0 of the circular disk 3.

According to this mechanism, when the driving lever 6 is operated to pivot from the initial position indicated by an arrow (A) toward the final position indicated by an arrow (B), the pin 8 as a follower is moved sliding in the groove 10 from the radially outer position toward the center 0 of the circular disk 3 and, therefore, the driven lever 7 is driven to pivot from the initial position (A') toward the final position (B'). The velocity of the pin 8 is decelerated rapidly as it approaches to the center 0 of the circular disk 3. In FIG. 23, the velocity distribution V' of the pin is shown. As is apparent from the velocity distribution V', the velocity of the pin becomes very slow in the press stroke of the slider being coupled to the pin as a follower. Accordingly, an amazingly high magnification of the force can be obtained according to the proposed mechanism and impact force upon pressing can be reduced considerably.

Although this mechanism has supreme advantages when compared with the conventional mechanism as mentioned above, it has still some structural problems to be improved. One of them is that the follower is guided to slide in the groove of the circular disk. Especially, the direction of the force P applied to the follower in the groove becomes substantially perpendicular to the direction of slide of the follower when it approaches to the center of the circular disk. In other words, the friction force against the follower becomes very large to cause a rapid wear of the follower.

SUMMARY OF THE INVENTION

One object of the present invention is to provide a force multiplier being capable of giving an ideal velocity distribution to a follower, in other words an amazingly high magnification of force, by a mechanism different from the fore going invention mentioned above.

Another object of the present invention is to provide a force multiplier in which a possible sliding friction force to be exerted onto the follower can be reduced considerably or almost equal to zero.

A further object of the present invention is to provide a force multiplier which is to provide a force multiplier which is applicable for every hand-operated press tool or for every motor-drive press machine.

To this end, according to the present invention, there is provided a force multiplier being comprised of a base supporting member, a driving lever being supported swingably by a first pivot means on said base supporting member which is reciprocated about the first pivot means in a predetermined angle being defined between a first and second positions thereof, a driven lever one end of which is pivotably coupled to the free end of the driving lever by a second pivot means, a follower being coupled to the other end of the driven lever which receives a multiplied force and transmits it to the other member, said follower being supported remote from the second pivot means by a distance substantially equal to the distance defined between the first and second pivot means, and a guide means for guiding the follower coupled to the driven lever which makes the driven lever swing about the second pivot in such a manner that the follower is located at a position furthest from the first pivot means when the driving lever is located at the first position thereof and, when the driving lever is swung to the second position thereof, the follower is located at a position nearest to the first pivot means.

According to the present invention, it becomes possible to minimize the distance between the first pivot means for the driving lever and the follower when the driving lever is positioned at the second position thereof. Also, it is to be noted that the distance between the first pivot means and the follower is decreased as the driving lever approaches to the second position and that the follower is decelerated rapidly as it approaches to the pivot means of the driving lever. Therefore, an output force with an amazingly high magnification of force is obtained as the follower approaches to the pivot means of the driving lever.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the invention will be apparent from the following description taken in connection with the accompanying drawings in which:

FIG. 20 shows a skeleton of a conventional press machine of the crank-pin type, FIG. 21 shows a skeleton of another conventional press machine of the toggle-joint type.

DESCRIPTION OF THE PREFERRED EMBODIMENTS

FIRST PREFERRED EMBODIMENT

Figure 1A:
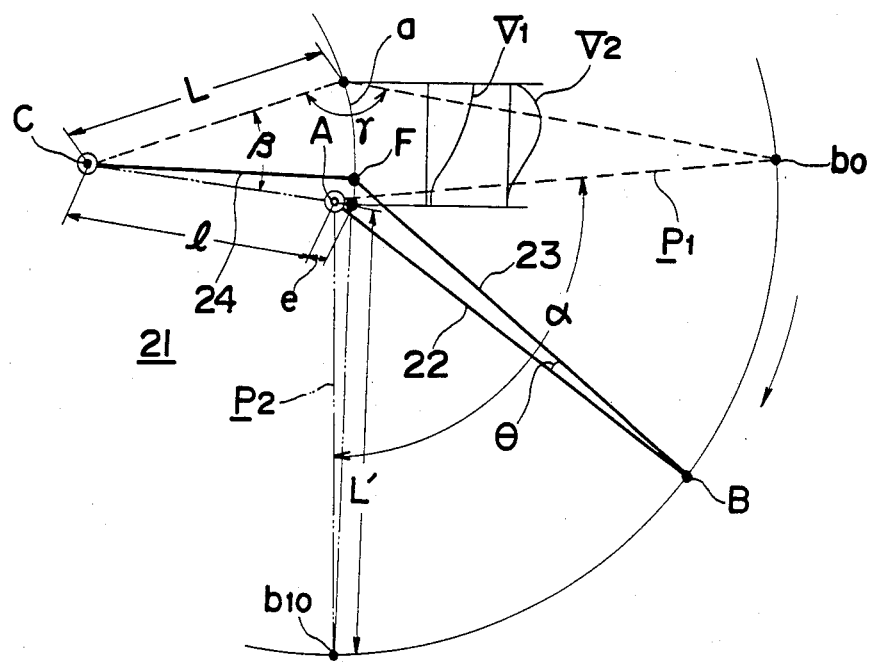
FIG. 1(a) shows a skeleton of a mechanism of the first embodiment according to the present invention.
Figure 1B:
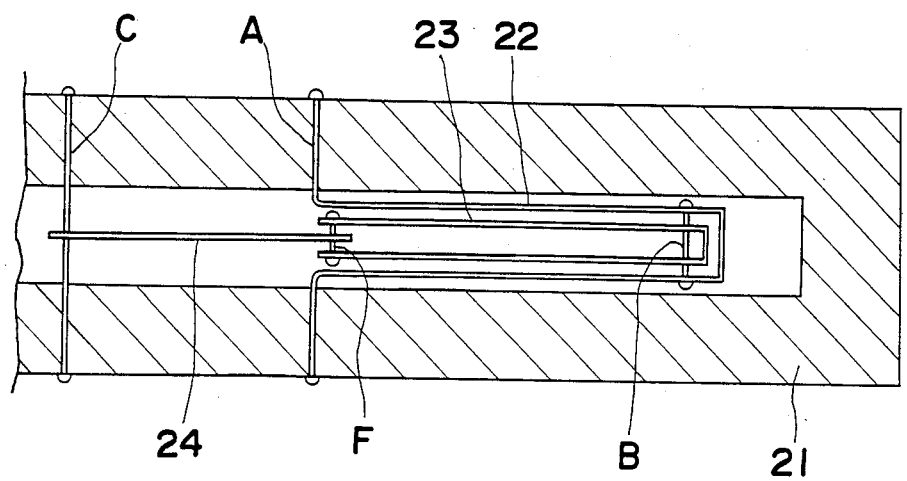
FIG. 1(b) is a plan view showing the pivotal structures of the mechanism shown in FIG. 1(a)

FIG. 1(a) and 1(b) show schematically a mechanism of the first preferred embodiment of the force multiplier according to the present invention.

The force multiplier provides a base frame member 21, a driving lever 22 one end of which is supported swingably by a first pivot means A on the base frame member 21, a driven lever 23 one end of which is connected to the other end of the driving lever 22 by a second pivot means B, and a guide lever 24 one end of which is supported swingably by a third pivot means C on the base frame member 21.

Each of the other ends of the driven lever 23 and guide lever 24 is hingedly coupled with each other by a follower F.

Said driving lever 22 is driven about the first point A so as to reciprocate in a predetermined angle $\alpha$ which is defined between a first position $P_1$ and a second position $P_2$ as indicated respectively by a dotted line and phantom chain line in FIG. 1(a). Said third pivot C for the guide lever 24 is set at a position on the base frame 21 where the guide lever 24 is coupled so as to define a predetermined obtuse angle $\gamma$ relative to the driven lever 23 when the driving lever 22 is positioned at the first position $P_1$ thereof. Further, the length of the driven lever 23 is set equal to that of the driving lever 22 and the length L of the guide lever 24 is set larger than the distance l defined between the first and third pivots A and C by a predetermined short instance e ($L=l+e$).

As is apparent from FIG. 1(a), the follower F is positioned at the remotest position from the first pivot A when the driving lever 22 is positioned at the first position $P_1$. When the driving lever 22 is operated to swing about the first pivot A clockwise in FIG. 1(a) from the first position $P_1$, the driven lever 23 is moved so as to follow to the driving lever 22 by the guide due to the guide lever 24 connected thereto by the follower F. Accordingly, the follower F is moved along an orbit "a" being defined as a portion of a circle which has the center thereof at the third pivot C and the radius equal to the length L of the guide lever 24. And when the driving lever 22 is moved to the second position $P_2$, the follower F is positioned at a position remote from the first pivot A only by said small distance e. Namely, the follower F approaches nearest to the first pivot A. Thus, the follower F is reciprocated along said orbit "a" and in an angle $\beta$, when the driving lever 22 is operated to reciprocate in the angle $\alpha$.

In FIG. 1(a), two velocity distributions $V_1$ and $V_2$ of the follower F are shown. The velocity distribution $V_1$ is obtained when the driving lever 22 is driven at a constant velocity. Also, the velocity distribution $V_2$ is obtained when the driving lever 22 is driven at a velocity being varied according to a sine function in such a case that the driving lever 22 is driven reciprocally by a motor. As is readable from these velocity distributions $V_1$, $V_2$, the follower F is driven at a very low velocity as it approaches to the first pivot A. Moreover, it is to be noted that there is caused no sliding friction between the follower F and the guide means 24 in the first embodiment since the follower F is guided by the guide lever 24 only with rolling friction therebetween (See FIG. 1(b)).

In this embodiment, the output force becomes larger as the distance e becomes smaller. A possible interference between the follower F and the first pivot A, when the former approaches to the latter, can be easily avoided by the use of the pivotal structure as is shown schematically in FIG. 1(b).

Second Preferred Embodiment

Figure 2:
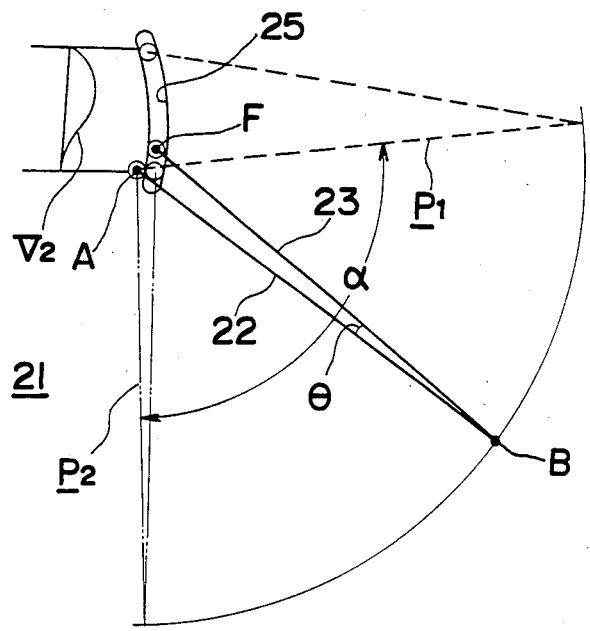
FIG. 2 shows a skeleton of a mechanism of the second embodiment according to the present invention.

FIG. 2 shows a second preferred embodiment according to the present invention. In this embodiment, an arc-like guide groove 25 is provided on the base frame 21 in place of the guide lever 24 of the first embodiment. The groove 25 is formed along the orbit "a" of the follower F shown in FIG. 1(a) and the follower F is fitted thereinto. Therefore, when the driving lever 22 is operated to move from the first position $P_1$ to the second position $P_2$, the follower F is moved along the guide groove 25 from the remotest position to the nearest position at where it is positioned distant from the first pivot A only by the small distance e.

Although the follower F is slidably contacted to the side walls defining the groove 25, the sliding friction applied to the follower F is relatively small since the direction of the force exerted onto the follower F is substantially the same to that of the guide groove 25. The velocity distribution of the follower F obtained when the driving lever 22 is reciprocated by a motor is the same to that of the first embodiment as is indicated by $V_2$ in FIG. 1(a).

Figure 3:
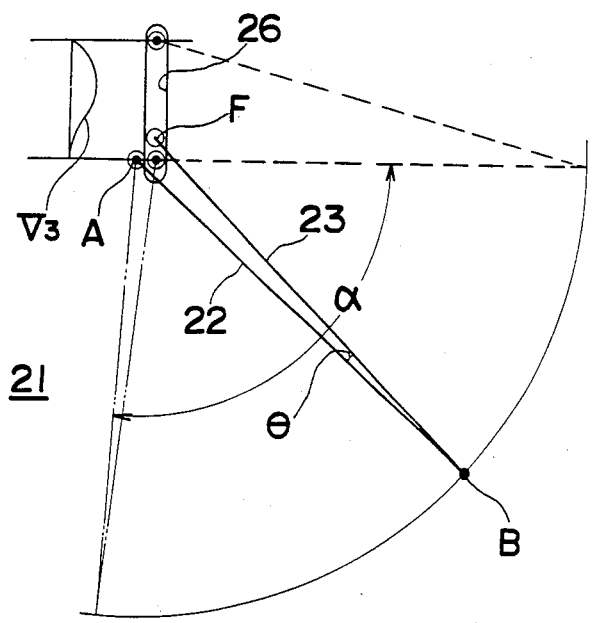
FIG. 3 shows a skeleton of a variation of the second embodiment in FIG. 2.

FIG. 3 shows a variation of the second preferred embodiment. In the variation, a guide groove 26 for guiding the follower F is formed straight. This is substantially equivalent to the case that the length L of the guide lever 24 of FIG. 1(a) or the radius of the arc of the guide groove 25 of FIG. 3 becomes infinitively large. Accordingly, the velocity distribution $V_3$ of the follower F obtained when the driving lever 25 is operated reciprocally by a motor is almost similar to the velocity distribution $V_2$ of FIG. 1(a) or FIG. 2.

Figure 4:
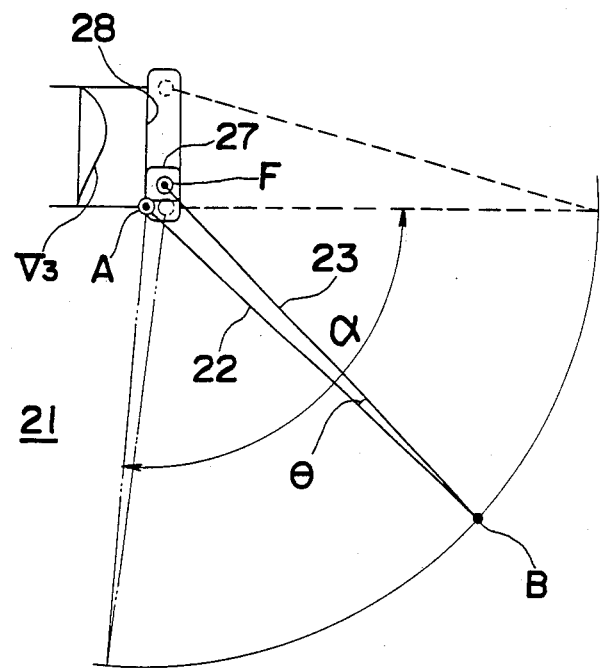
FIG. 4 shows a skeleton of another variation of the second embodiment.

In order to guide the follower F in the guide groove more smoothly, it is desirable, as shown in FIG. 4, to provide a pair of square metal guides 27 being coupled hingedly by the follower F. These square metal guides 27 are fitted slidably into straight guide grooves 28 each having a relatively wide width. This structure is advantageous for improving the strength and durability of the mechanism.

Third Preferred Embodiment

Figure 5:
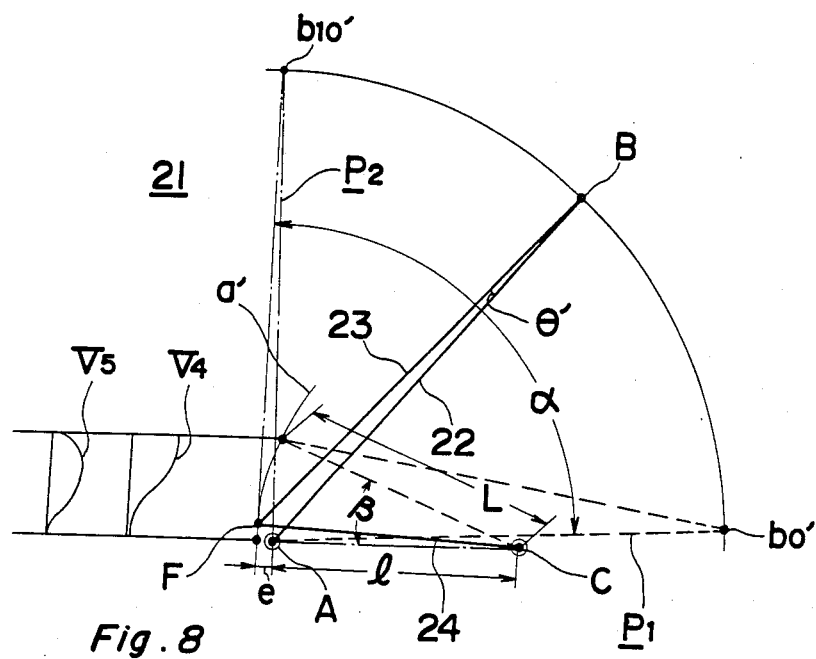
FIG. 5 shows a skeleton of a mechanism of the third embodiment according to the present invention.

FIG. 5 shows the third preferred embodiment according to the present invention. As is apparent from FIG. 5 when compared with FIG. 1(a), each element or member in the third embodiment is the same to each corresponding one in the first embodiment and is indicated by a same numeral reference in FIG. 5. Also each length of levers 22, 23 and 24 is set equal to that of FIG. 1(a). The only difference between the third and first embodiments is that the third pivot C is so arranged as to be positioned on the side same as the second pivot B with respect to the first pivot A. When the driving lever 22 is positioned at the first position $P_1$ of the driving lever 22, the driven lever 23 makes an acute angle with the guide lever 24.

In the third embodiment, when the driving lever 22 is reciprocated around the first pivot A in the predetermined angle $\alpha$, the guide lever 24 is reciprocated around the third pivot C in the angle $\beta$ and the follower F is reciprocated along the arc orbit a'. The third embodiment has an advantage that the mechanism can be made compact since the guide lever 24 is arranged on the side same to that of the driving lever 22.

As indicated by $V_4$ and $V_5$ in FIG. 5, the same velocity distributions as in FIG. 1(a) are also obtained in this embodiment.

Figure 6:
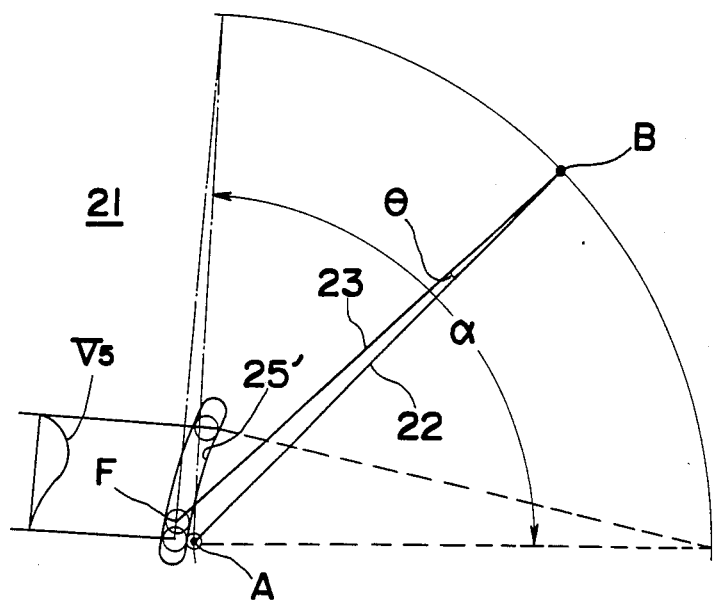
FIG. 6 shows a skeleton of a variation of the third embodiment shown in FIG. 5.

The guide lever 24 can be replaced with a guide groove 25' for guiding the follower F as shown in FIG. 6. The guide groove 25' is so formed as to guide the follower F along the orbit a' of FIG. 5.

Although the third embodiment seems essentially same to the first embodiment, there is an important difference between the third and first embodiments as follows.

Figure 7:
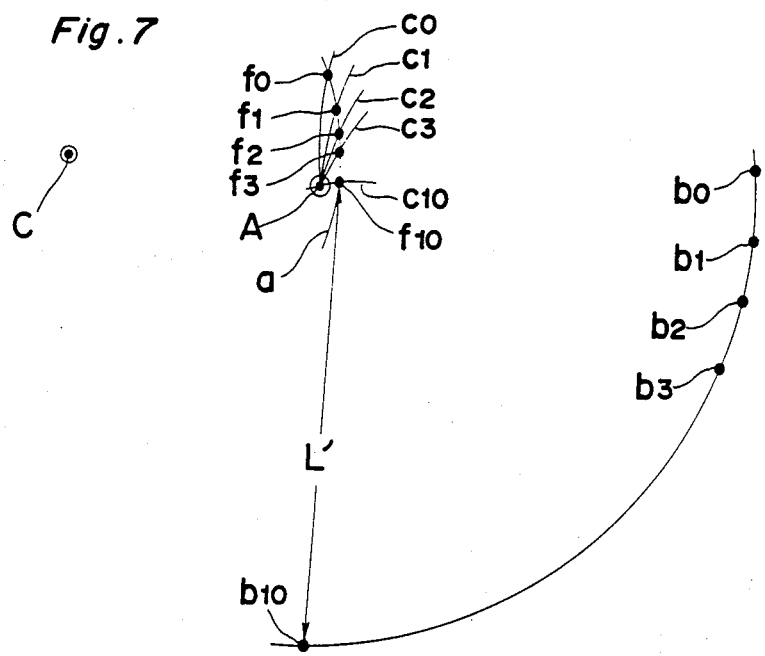
FIG. 7 is an explanative plan view for showing the orbit of the follower according to the first embodiment of FIG. 1(a)

In the first embodiment of FIG. 1(a), as shown in FIG. 7, the position of the follower F is determined as an intersection fi (i=0,1, . . . ,10) of the circle "a" with the circle ci. The circle "a" has its center at the third pivot C and has the radius equal to L. The circle ci is defined as a circle having its center at a position bi of the second pivot B and having the radius L' which is equal to the length of the driven lever 23. In the case, the center C of the circle "a" and the center bi of the circle ci are opposed to each other with respect to the follower F. Accordingly, the position of the follower F is determined definitely as an intersection between two circles a and ci.

Figure 8:
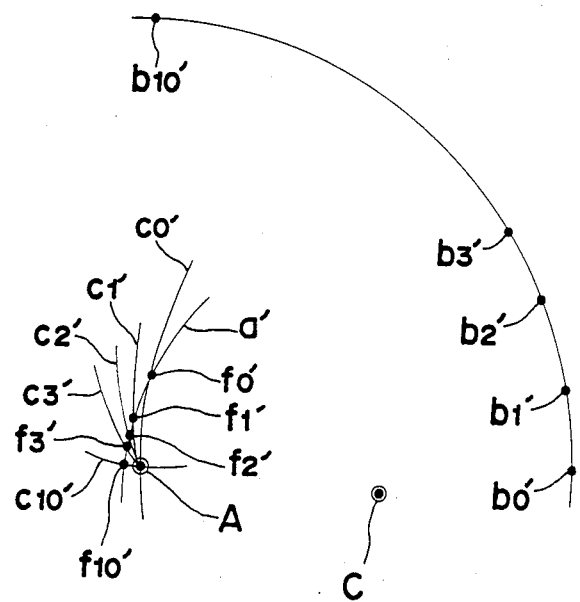
FIG. 8 is an explanative plan view for showing the orbit of the follower according to the third embodiment of FIG. 5.

Also in the third embodiment, as shown in FIG. 8, the position of the follower F is determined as an intersection fi (i=0,1,2, . . . ,10) along the circle a' having its center at the third pivot C and the radius equal to the length L f the guide lever 24 and the circle ci' having its center at a position bi' of the second pivot B and the radius equal to the length L' of the driven lever 23.

However, in this case, the centers C and bi' of circles a' and ci' are on the same side when seen from the side of the follower F.

Due to this, it becomes difficult a little bit to maintain a high positioning accuracy with the follower F.

Hereafter, examples of application of the force multiplier according to the present invention will be stated.

Caulking Tool

Figure 9:
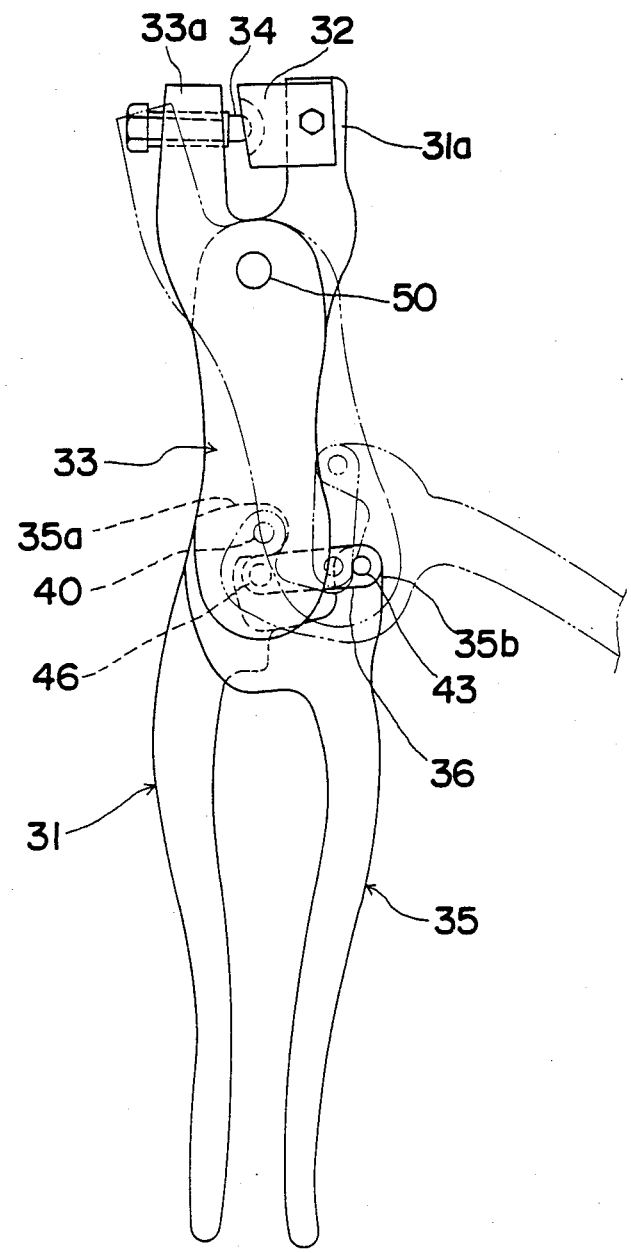
FIG. 9 is a plan view of a caulking tool to which the force multiplier according to the present invention is applied.
Figure 10:
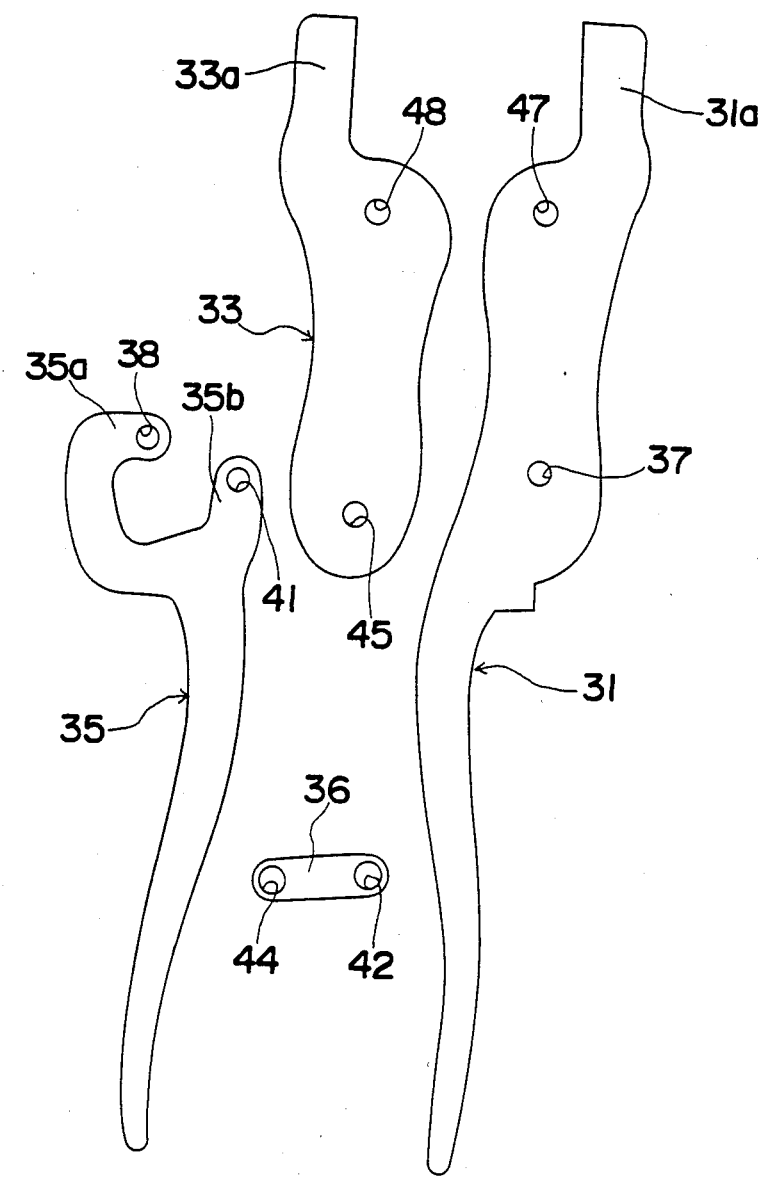
FIG. 10 is a dissolved plan view of the caulking tool shown in FIG. 9.

FIGS. 9 and 10 show a caulking tool to which the mechanism of FIG. 5 is applied.

The caulking tool is comprised of a first pressing lever 31 supporting a die 32 fixedly at the free end 31a thereof (which corresponds to the base supporting frame 21), a second pressing lever 33 having a punch 34 so fixed at the free end 33a thereof as to oppose to the die 32 (which corresponds to the guide lever 24), a driving lever 35 having two arms 35a and 35b which are forked off into two at one end thereof and a driven lever 36.

Said one arm 35a of the driving lever 35 is pivoted on the first pressing lever 31 by a pin 40 which is fitted into holes 37 and 38 provided on said one arm 35a and the first pressing lever 31 respectively. The other arm 35b is pivoted on the driven lever 36 by a pin 43 which is fitted into holes 41 and 42 provided on the other arm 35b and the driven lever 36 respectively. Said pins 40 and 43 correspond to the first and second pivots A and B respectively. Further, the driven lever 36 is pivoted at the other end thereof onto the second pressing lever 33 by a pin 46 (which corresponds to the follower F) which is fitted into holes 44 and 45. Said first and second levers 31 and 33 are coupled rotatably to each other by a pin 50 (which corresponds to the third pivot C) being fitted into holes 47 and 48.

Upon operating the tool, the driving lever 35 is opened to the position indicated by phantom line to insert a work (not shown) between the die 32 and the punch 34. After insertion of the work, the driving lever 35 is operated to pivot clockwise about the pin 40 as the first pivot. Accordingly, the pin 46 as the follower approaches to the pin 40 and the second pressing lever 33 is pivoted clockwise about the pin 50 to caulk the work with the punch 34 cooperatively with the die 32.

As is apparent from FIG. 9, the pivotal angle of the second pressing lever 33 is sufficiently smaller than that of the driving lever 35 and the second pressing lever 33 is decelerated much more as the driving lever 35 approaches to the final position thereof indicated by the solid line in FIG. 9. Therefore, the work is caulked with a very strong press force.

Compressing Tool

Figures 11, 13:
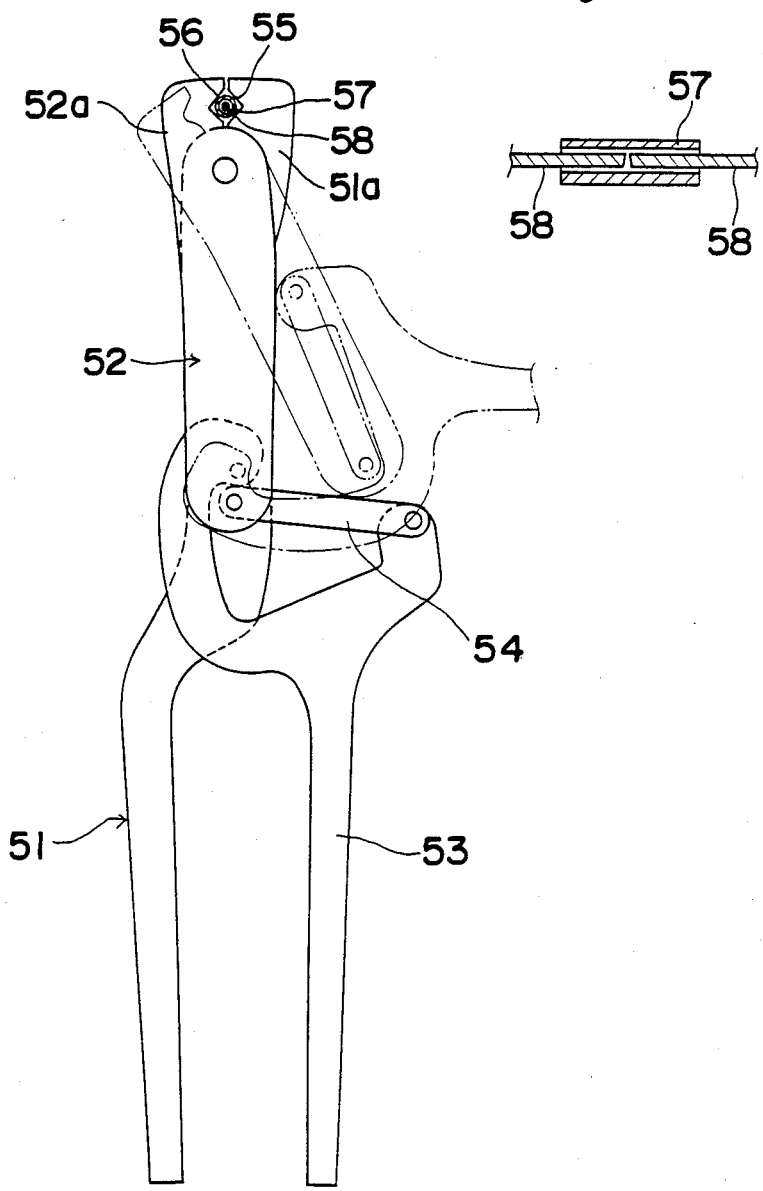
FIG. 11 is a plan view of a compression tool to which the force multiplier according to the present invention is applied.
FIG. 13 is a cross-sectional view of a connecter for connecting electrical wires.
Figure 12:
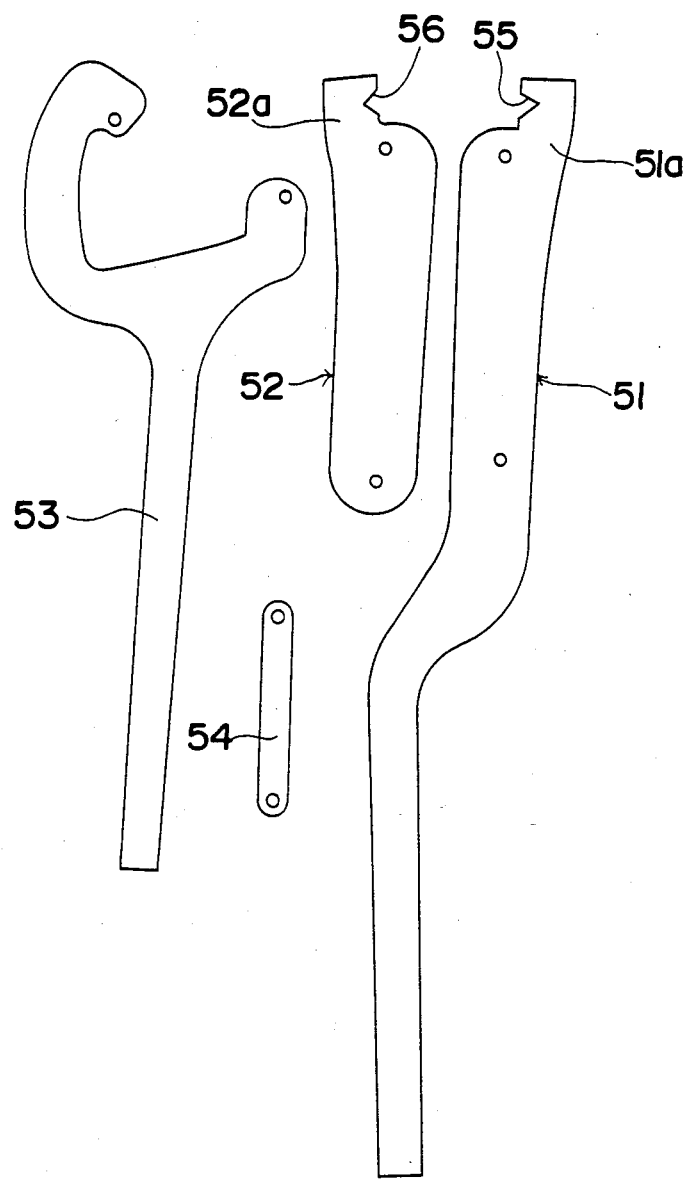
FIG. 12 is a dissolved plan view of the compression tool shown in FIG. 11.

FIGS. 11 and 12 show a compressing tool having structures similar to those of the caulking tool shown in FIGS. 9 and 10. The compressing tool is comprised of first and second pressing lever 51 and 52, a driving lever 53 and a driven lever 54. These levers correspond to those of the caulking tool one to one. Said first and second pressing lever 51 and 52 have triangular concave portions 55 and 56 for compressing a connector 57 therebetween at their respective free end 51a, 52a which are formed opposite to define a rectangular hole when mated to each other. This compressing tool is useful to compress a workpiece such as a connector 57 for connecting two electric wires 58, 58 as shown in FIG. 13.

Auto-Drive Press Machine

Figure 14:
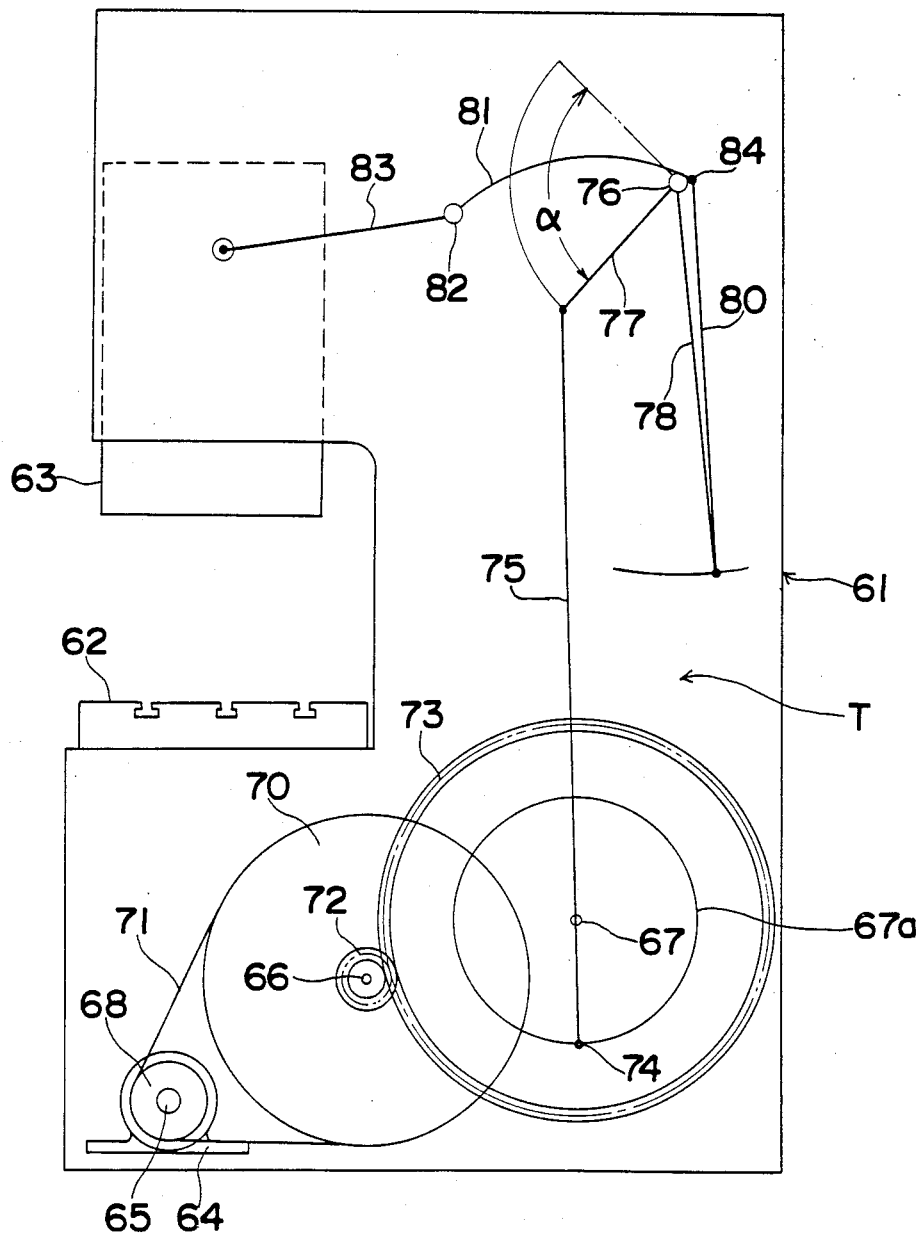
FIG. 14 shows a skeleton of an auto-drive press machine to which the present invention is applied.

FIG. 14 shows schematically an auto-drive press machine to which the mechanism shown in FIG. 5 is applied.

As shown in FIG. 14, the press has a bed 62 for putting a work piece (not shown) thereon which is fixed to the main frame 61 and a slider 63 for pressing the workpiece onto the bed 63 which is slidably guided in the up and down direction by the main frame 61. Said slider 63 is moved up and down via a transmission mechanism T by an electric motor 64 housed in the bottom portion of the main frame 61.

In the main body frame 61, a pivotal shaft 66 and crank shaft 67 are rotatably supported respectively parallel to the drive shaft 65. Two small and large pulleys 68 and 70 are fixed coaxially with the drive shaft 65 and the pivotal shaft 66 respectively and the pivot shaft 66 is driven at a decelerated velocity by the motor 64 via an endless belt 71 spanned between two pulleys 68 and 70. A small pinion 72 is fixed to the pivotal shaft 66 coaxially and a large pinion 73 engaging to the small pinion 72 is fixed to the crank shaft 67 coaxially in order to rotate the crank shaft 67 at a rotational velocity lower than that of the pivotal shaft 66.

A crank pin 74 is fixed on the crank disk 67a being rotated together with the crank shaft 67 and a connecting rod 75 is provided for connecting the crank pin 74 with the free end of a transmission lever 77 which is pivotally supported by a pivotal axis 76 ( this corresponds to the first pivot A). Due to this connecting rod 75, the transmission lever 77 is reciprocated one time in a predetermined angle $\alpha$ defined between a solid line and a phantom line in FIG. 14 during the crank shaft 67 is rotated by one revolution.

Figure 15:
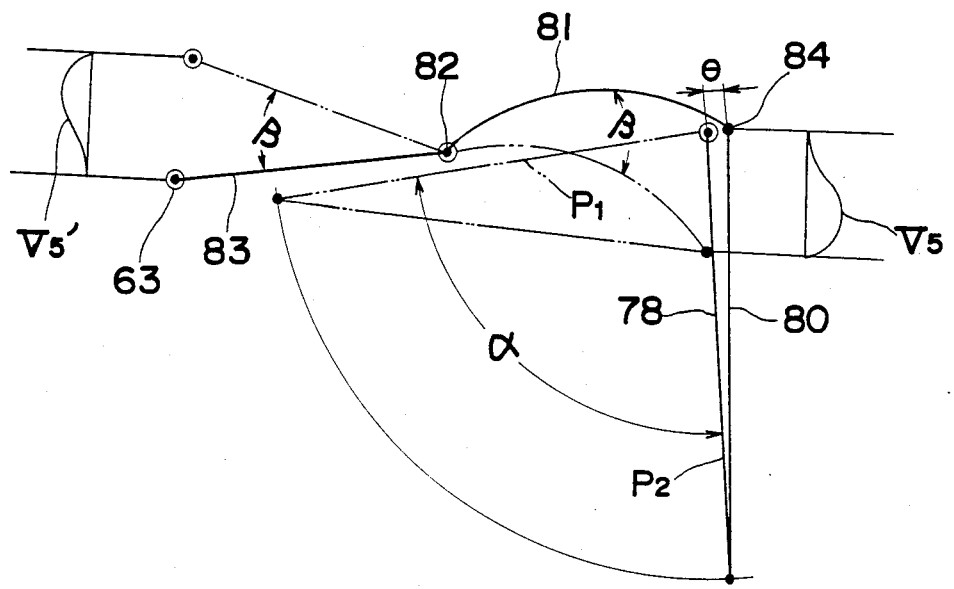
FIG. 15 shows motions of the mechanism of FIG. 14.
Figure 16A:
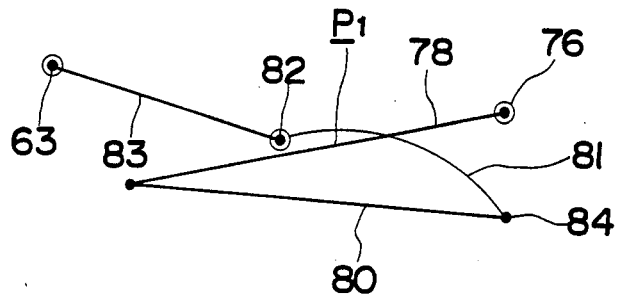
FIG. 16(a), (b) and (c) show sequentially the motion of the slider in the press stroke of the press machine shown in FIG. 14.
Figure 16B:
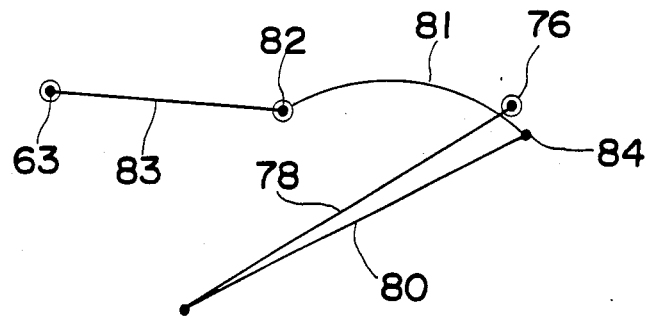
Figure 16C:
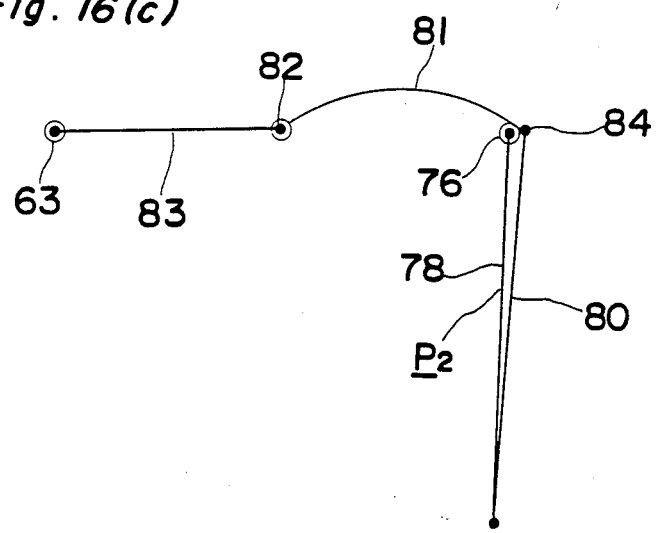

A driving lever 78 is fixed to the pivotal axis 76 at the upper end thereof and therefore, it is reciprocated about the pivotal axis 76 in the angle $\alpha$ accompanied with the reciprocal motion of the transmission lever 77 as shown in FIG. 15. Said driving lever 78 constitutes the force multiplier of FIG. 5 together with a driven lever 80 and a curved guide lever 81 which is fixed to a pivotal axis 82 at one end thereof. An action lever 83 is fixed to the pivotal axis 82 at one end thereof which is connected to the slider 63 at the other end thereof. Accordingly, when the guide lever 81 is driven by the driving lever 78 to swing reciprocally about the pivotal axis 82 in the angle $\beta$, the action lever 83 is also driven to swing reciprocally about the pivotal axis 82 in the angle $\beta$ as shown in FIG. 15. According to the pivotal motion of the action lever 83, the slider 63 is moved reciprocally in the up and down direction. As is apparent from comparisons of the mechanism of FIG. 14 with that of FIG. 5, the pivotal shaft 84 as the follower F is driven according to a velocity distribution as indicated by $V_5$ in FIG. 15. Namely, the pivotal axis 84 as the follower is decelerated to a very slow velocity as it approached to the pivotal shaft 76 of the driving lever 78. Since the slider 63 connected to the other end of the action lever 83 is moved symmetrically with respect to the pivotal axis 82, an ideal velocity distribution $V'_5$ as shown in FIG. 15 is obtained with respect to the slider 63. Namely, the slider 63 is rapidly decelerated in its press stroke to give an amazingly large press force. FIGS. 16(a), (b) and (c) show the down stroke motion of the slider 63 successively when the driving lever 78 is driven from its initial position $P_1$ to the final position $P_2$.

Figure 17:
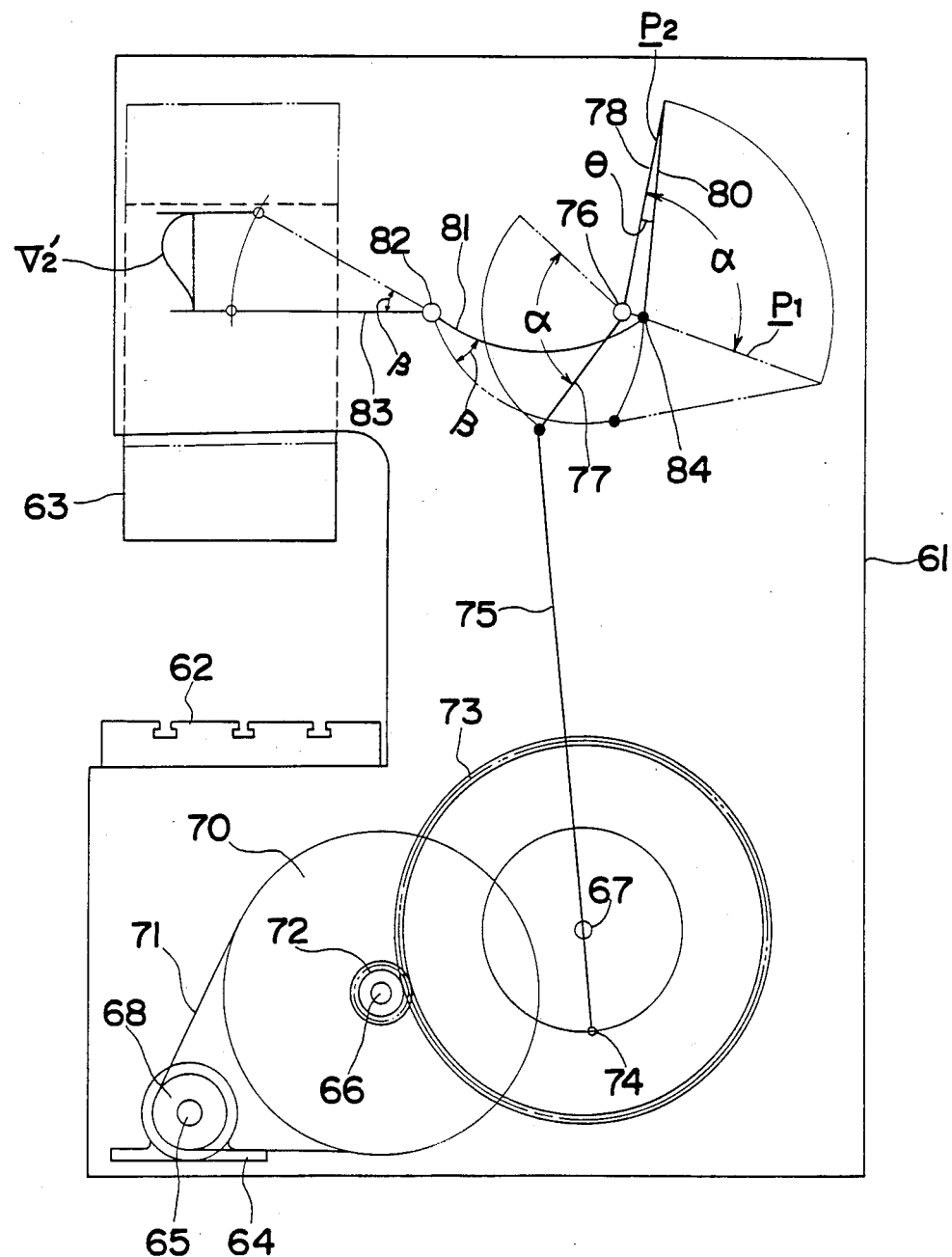
FIG. 17 shows a skeleton of another auto-drive press machine to which the present invention is applied.

FIG. 17 shows schematically another press machine to which the force multiplier mechanism shown in FIG. 1(a) is applied.

In FIG. 17, identical numeral references are referred to all elements equivalent to those of the press machine mentioned in FIG. 14. As is apparent from the comparison of FIG. 17 with FIG. 1(a), the force multiplier mechanism of the FIG. 17 is arranged in a reversed relation with respect to the arrangement of FIG. 1(a) in the up and down direction.

In the press machine, when the driving lever 78 is driven from the first position $P_1$ to the second position $P_2$, the slider 63 is moved downwards at a velocity according to the velocity distribution as indicated by $V'_2$ in FIG. 17.

Figure 18:
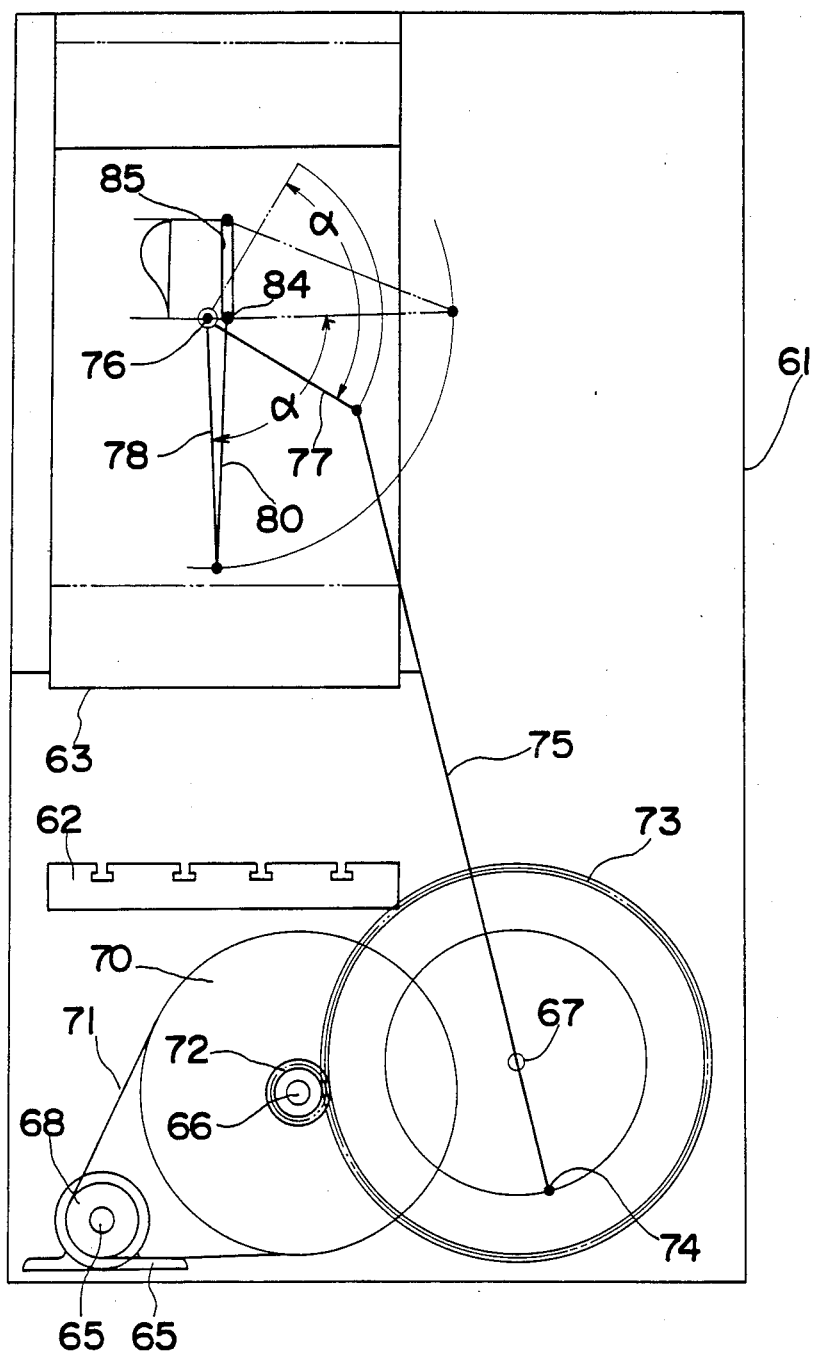
FIG. 18 shows a skeleton of one more auto-drive press machine to which the present invention is applied.

FIG. 18 shows a press machine to which the force multiplier mechanism shown in FIG. 3 is applied.

In FIG. 18, all the elements substantially equivalent to those of FIG. 14 are indicated by the same numeral references respectively. In this press machine, a straight guide groove 85 is formed on the base frame member in place of the guide lever 84 of FIG. 14. In order to guide the pivotal axis 84 more smoothly, it is desirable to provide a square metal guide as shown in FIG. 4.

As is mentioned above, the follower can approach towards to the first pivot by a very short distance if necessary, and the equivalent leverage ratio of the follower to the driving lever can thus be increased to an amazingly high ratio.

Figure 19:
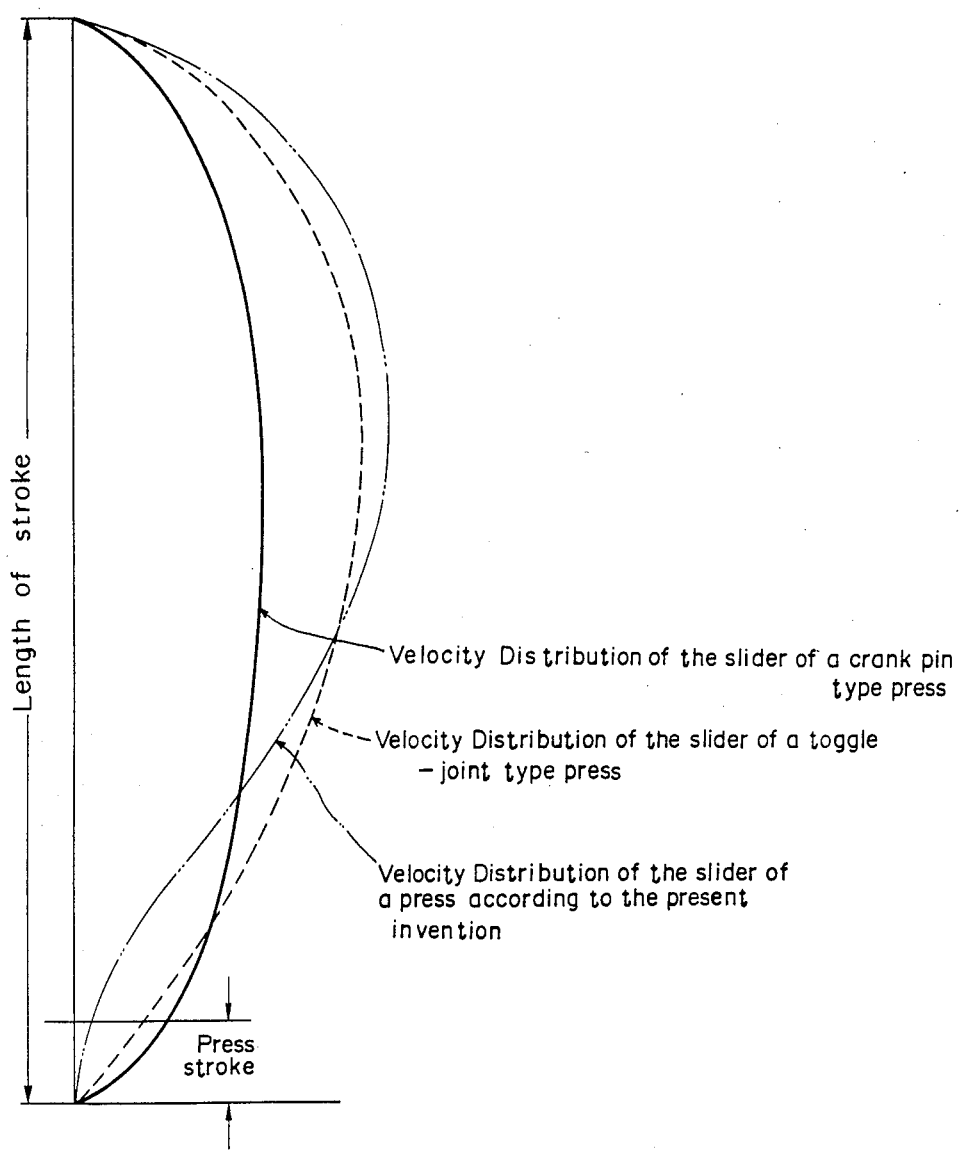
FIG. 19 is a graph showing a velocity distribution of the follower or the slider according to the present invention together with velocity distributions obtained in the conventional press machines.
Figure 22:
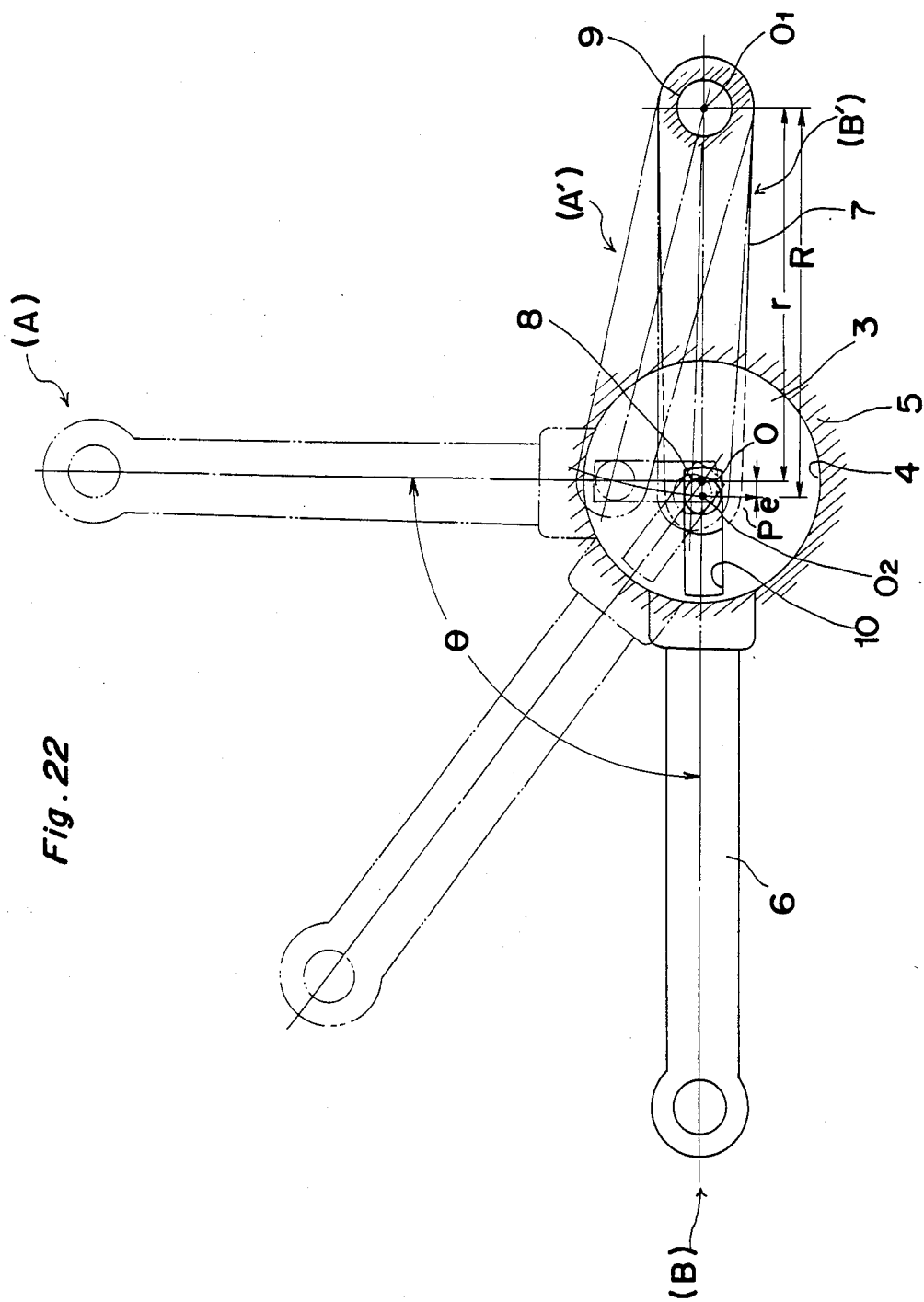
FIG. 22 is a side view of the force multiplier proposed by the inventor of the present application and FIG. 23 shows the motion of the follower in said force multiplier proposed.
Figure 23:
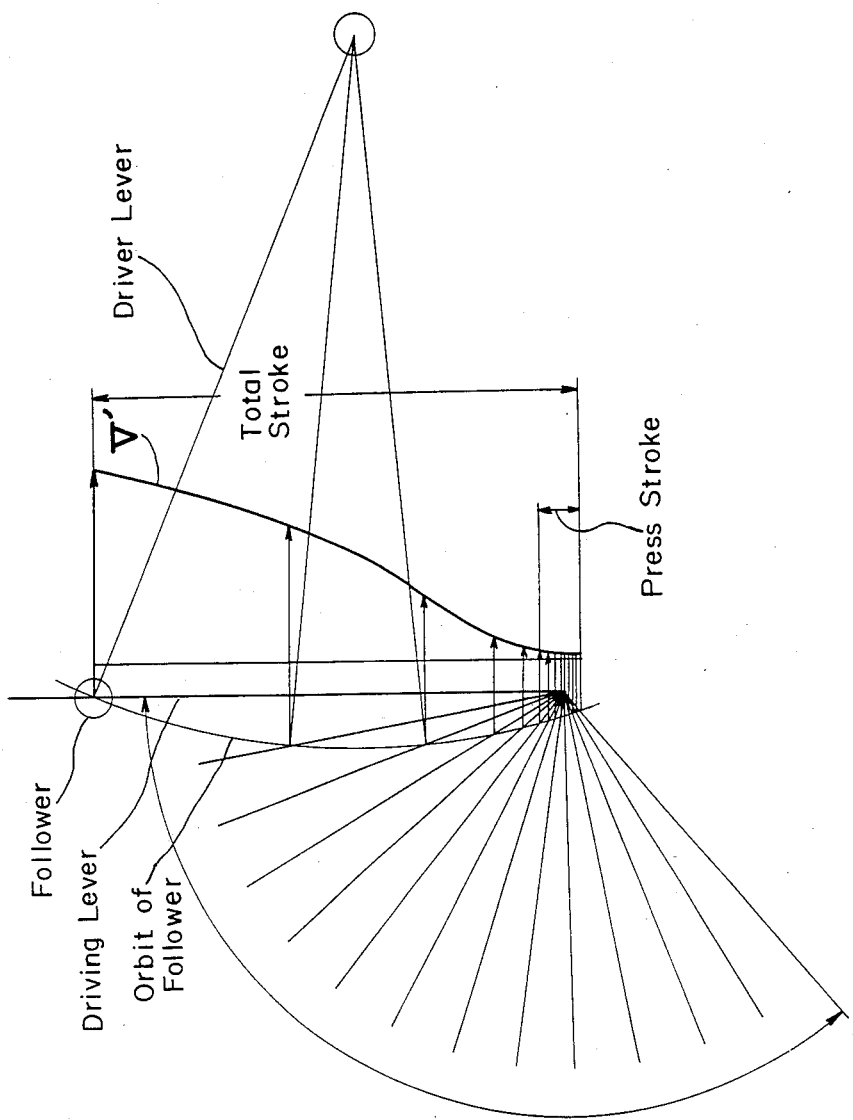

FIG. 19 shows an exact velocity distribution of the slider of the auto-drive press machine according to the present invention together with those the conventional press machines of the crank pin type and the toggle joint type obtained under the same stroke conditions (namely the same stroke and stroke number) to those of the press according to the present invention.

As is apparent from FIG. 19, the velocity of the slider in the press stroke becomes smaller than one-fourth of that of the crank pin type and than one-third of that of the toggle joint type.

Therefore, according to the present invention, there is provided an ideal force multiplier being applicable to all tools and/or machines which need a multiplied press force.

It is further understood by those skilled in the art that the foregoing description is the preferred embodiments of the present invention and that various changes and modifications may be made in the invention without departing from the spirit and scope thereof as defined by the appended claims.

What is claimed is:

1. A force multiplier mechanism comprising:
a base supporting member;
a driving lever having a predetermined length and including a first pivot position separated by a predetermined distance from a second pivot position along the length of said driving lever;
a first pivot for pivotably connecting said first pivot position of said driving lever to said base supporting member;
a driven lever having a predetermined length and including a first pivot position separated by a predetermined distance from a second pivot position along the length of said driven lever;
a second pivot for pivotably connecting said first pivot position of said driven lever to said second pivot position of said driving lever;
a follower pivotably connected to said driven lever at the second pivot position for receiving an increased multiplied force and transmits the force to an additional structure in a device in which the force multiplier mechanism is being utilized, said follower being pivotably supported remote from said second pivot by said driven lever at a distance substantially equal to the distance defined between said first and second pivots; and
a guide for positively guiding the movement of said follower from a first position displaced a predetermined distance from said first pivot, along a continuous substantially radially extending pathway to a point located substantially close to said first pivot, positioning said follower at said point results from movement of said driving lever from a first position through a predetermined angle about said first pivot to a second position pivoting and actuating said driven lever and producing an increase in the multiplied force as said follower is moved to said point located substantially close to said first pivot.

2. A manually operated force multiplier mechanism comprising:
a first lever for engaging a workpiece, said first lever having a predetermined length and including a first pivot position separated by a predetermined distance from a second pivot position on said first lever;
a second lever for engaging a workpiece, said second lever having a predetermined length and including a first pivot position separated by a predetermined distance from a second pivot position on said second lever;
a driving lever having a predetermined length and including a first pivot position separated by a predetermined distance from a second pivot position along the length of said driving lever;
a driven lever having a predetermined length and including a first pivot position separated by a predetermined distance from a second pivot position along the length of said driven lever;
a first pivot for pivotably connecting said first pivot position of said driving lever to said first pivot position of said first lever;
a second pivot for pivotably connecting said first pivot position of said driven lever to said second pivot position of said driving lever;
a third pivot for pivotably connecting said second pivot position of said first lever to said second pivot position of said second lever; and
a follower pivotably connected to said second pivot position of said driven lever and to the first pivot position of said second lever for receiving an increased multiplied force, said follower being pivotably supported remote from said second pivot by said driven lever at a distance substantially equal to the distance defined between said first and second pivot;
said follower being operatively connected to said second lever for positively guiding the movement of said follower from a first position displaced a predetermined distance from said first pivot, along a continuous substantially radially extending pathway to a point located substantially close to said first pivot, positioning said follower at said point results from movement of said driving lever from a first position through a predetermined angle about said first pivot to a second position pivoting and actuating said driven lever and producing an increase in the multiplied force between said first and second levers as said follower is moved to said point located substantially close to said first pivot.

3. The mechanism according to claim 2, wherein the distance between said first and second pivot is substantially equal to the distance between said second pivot and said follower.

4. The mechanism according to claim 2, wherein the distance between said first and second pivot is substantially equal to the distance between said second pivot and said follower and the distance between said third pivot and said follower is set different from the distance between said first and third pivots by a predetermined minute distance.

5. The mechanism according to claim 2, wherein said third pivot is positioned so that said guide lever makes a predetermined obtuse angle with said driven lever when said driver lever is located at its first position thereof.

6. The mechanism according to claim 1, wherein said guide means is a guide groove formed in the base supporting frame.

7. The mechanism according to claim 6, wherein said guide groove is formed as an arc-like groove having its center of curvature on a side opposite to the side of the second pivot means with respect to the follower when the driving lever is located at the first position thereof.

8. The mechanism according to claim 6, wherein said guide groove is formed as an arc-like groove having its center of curvature on a side same to the side of the second pivot means with respect t the follower when the driving lever is located at the first position thereof.

9. The mechanism according to claim 6, in which said guide groove is a groove formed straight.

10. The mechanism according to claim 1, wherein the position of the third pivot is so chosen so that the guide lever makes a predetermined obtuse angle with the driven lever when the driving lever is located at the first position thereof.

11. The mechanism according to claim 1, wherein the position of the third pivot is so chosen so that the guide lever makes a predetermined acute angle with the driven lever when the driving lever is located at the first position thereof.

12. The mechanism according to claim 1, wherein said guide is configured to provide an arcuate substantially radially extending pathway.

13. The mechanism according to claim 1, wherein said guide means is a guide lever pivotably connected to said base supporting member by a third pivot wherein said first pivot is located at a predetermined distance from said third pivot.

14. The mechanism according to claim 1, wherein the distance between said first and second pivot is substantially equal to the distance between said second pivot and said follower.

15. The mechanism according to claim 13, wherein the distance between said first and second pivot is substantially equal to the distance between said second pivot and said follower and the distance between said third pivot and said follower is set different from the distance between said first and third pivots by a predetermined minute distance.

16. The mechanism according to claim 13, wherein said third pivot is positioned so that said guide lever makes a predetermined obtuse angle with said driven lever when said driver lever is located at its first position thereof.

17. The mechanism according to claim 13, wherein the position of the third pivot means is so chosen so that the guide lever makes a predetermined acute angle with the driven lever when the driving lever is located at the first position thereof.

* * * * *